US010871945B2

(12) United States Patent
Antonopoulos et al.

(10) Patent No.: US 10,871,945 B2
(45) Date of Patent: Dec. 22, 2020

(54) RESUMABLE MERGE SORT

(71) Applicant: Microsoft Technology Licensing, LLC, Redmond, WA (US)

(72) Inventors: Panagiotis Antonopoulos, Redmond, WA (US); Nitish Upreti, Kirkland, WA (US); Alexander Thien Tran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 15/953,000

(22) Filed: Apr. 13, 2018

(65) Prior Publication Data

US 2019/0317727 A1  Oct. 17, 2019

(51) Int. Cl.
| | | |
|---|---|---|
| G06F 7/16 | (2006.01) | |
| G06F 3/06 | (2006.01) | |
| G06F 16/16 | (2019.01) | |
| G06F 7/24 | (2006.01) | |

(52) U.S. Cl.
CPC .............. *G06F 7/16* (2013.01); *G06F 3/0604* (2013.01); *G06F 3/0656* (2013.01); *G06F 3/0679* (2013.01); *G06F 7/24* (2013.01); *G06F 16/16* (2019.01)

(58) Field of Classification Search
CPC ............... G06F 7/36; G06F 16/16; G06F 7/24
See application file for complete search history.

(56) References Cited

U.S. PATENT DOCUMENTS

| | | | | |
|---|---|---|---|---|
| 5,084,815 | A * | 1/1992 | Mazzario | G06F 7/36 |
| 5,870,563 | A * | 2/1999 | Roper | H04L 29/06 |
| | | | | 370/351 |
| 5,924,093 | A * | 7/1999 | Potter | G06F 7/36 |
| 2009/0077135 | A1* | 3/2009 | Yalamanchi | G06F 16/2336 |
| 2015/0223098 | A1* | 8/2015 | Sze | H04L 47/18 |
| | | | | 370/235 |
| 2016/0117375 | A1 | 4/2016 | Antonopoulos | |
| 2016/0352795 | A1* | 12/2016 | Badulescu | H04L 51/04 |
| 2018/0121494 | A1 | 5/2018 | Antonopoulos et al. | |

OTHER PUBLICATIONS

Tran, et al., "Resumable and Online schema transformations", Application as filed in U.S. Appl. No. 15/588323, filed May 5, 2017, 67 Pages.
Graefe, et al., "'Pause and resume' functionality for index operations", In Proceedings of the IEEE 27th International Conference on Data Engineering Workshops, Apr. 11, 2011, pp. 28-33.
Graefe, Goetz, et al., "Implementing Sorting in Database Systems", In Journal of ACM Computing Surveys, vol. 38, Issue 3, Sep. 2006, pp. 1-37.

(Continued)

*Primary Examiner* — Charles E Lu
(74) *Attorney, Agent, or Firm* — Ray Quinney & Nebeker; Thomas M. Hardman; Timothy J. Churna

(57) ABSTRACT

A method may include receiving a database command to sort an unsorted dataset; dividing a sort operation, for sorting the unsorted dataset, into a plurality of portions; performing a first portion of the sort operation; persisting intermediate results from the first portion of the sort operation; and persisting a state of the sort operation identifying the portions of the sort operation have been performed.

18 Claims, 13 Drawing Sheets

(56) References Cited

OTHER PUBLICATIONS

Graefe, Goetz, "Sorting and Indexing with Partitioned B-Trees", In Proceedings of First Biennial Conference on Innovative Data Systems Research, Jan. 5, 2003, 13 Pages.

Mohan, et al., "Algorithms for Creating Indexes for Very Large Tables without Quiescing Updates", In Proceedings of the ACM SIGMOD international conference on Management of data, Jun. 2, 1992, pp. 361-370.

Ponnekanti, et al., "Online Index Rebuild", In Proceedings of the ACM SIGMOD international conference on Management of data, May 16, 2000, pp. 529-538.

"International Search Report and Written Opinion Issued in PCT Application No. PCT/US19/024447", dated Jun. 13, 2019, 14 Pages.

Chandramouli, et al. "Query Suspend and Resume", In Proceedings of The ACM SIGMOD International Conference on Management of Data, Jun. 12, 2007, pp. 557-568.

\* cited by examiner

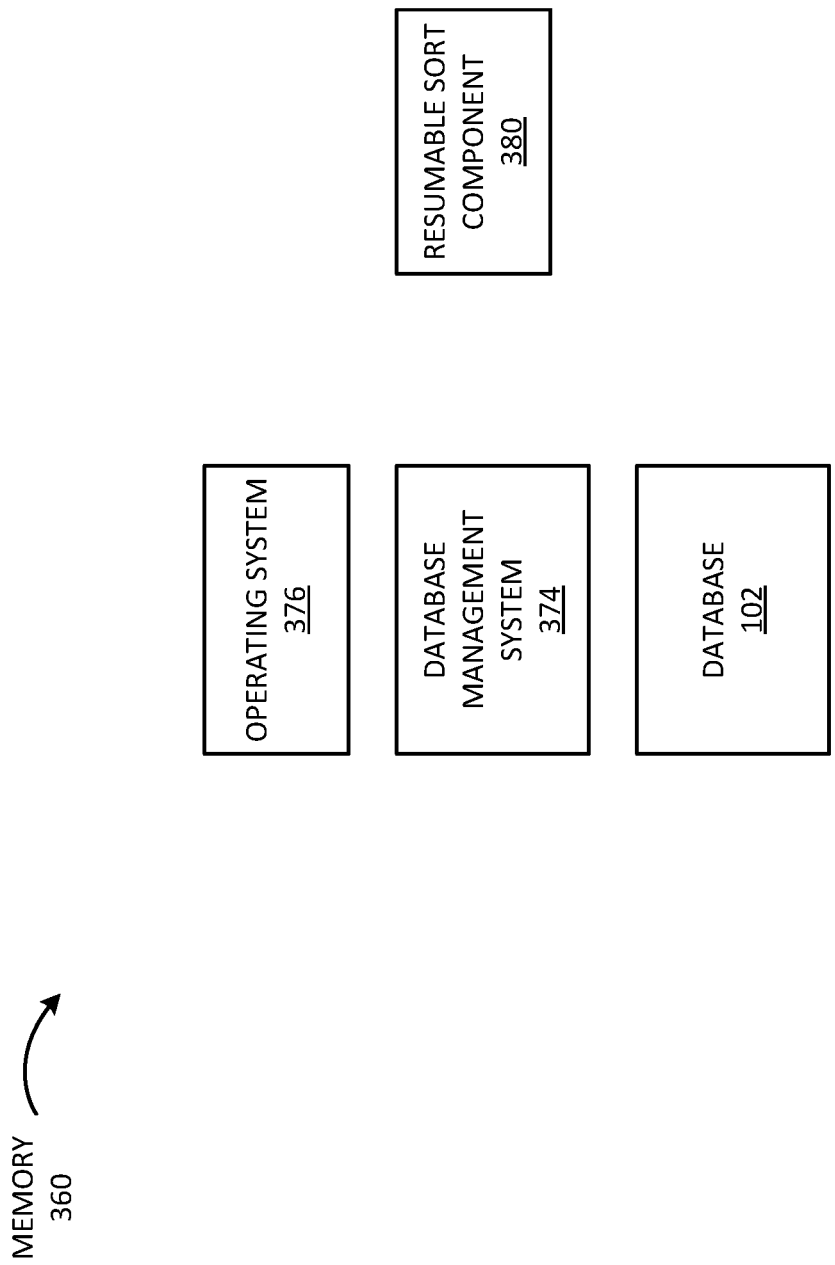

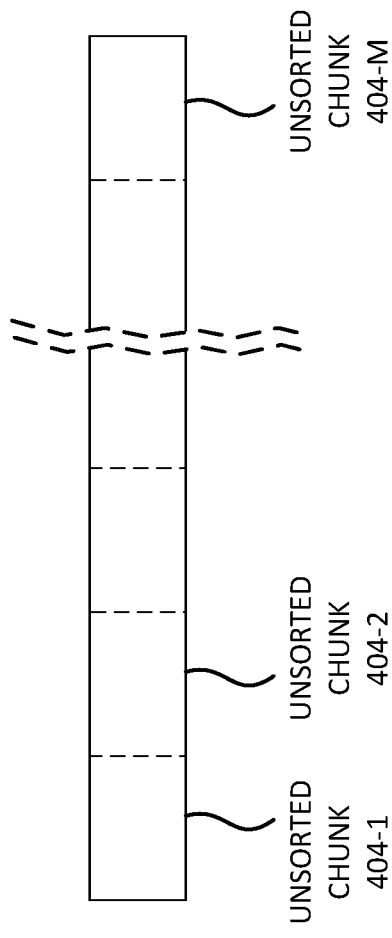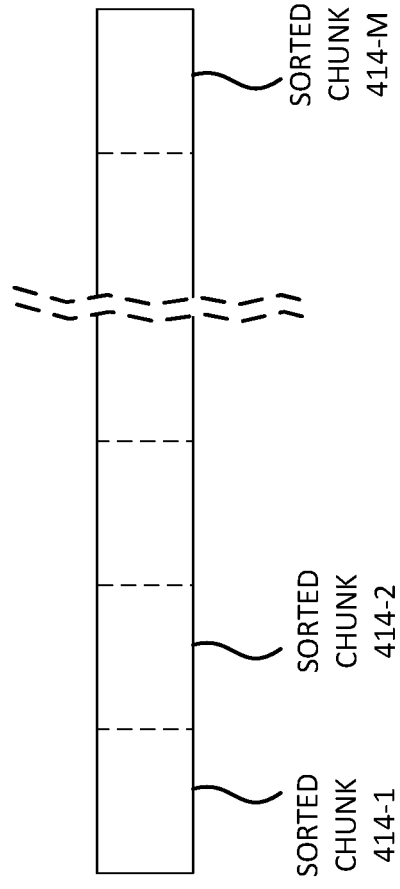

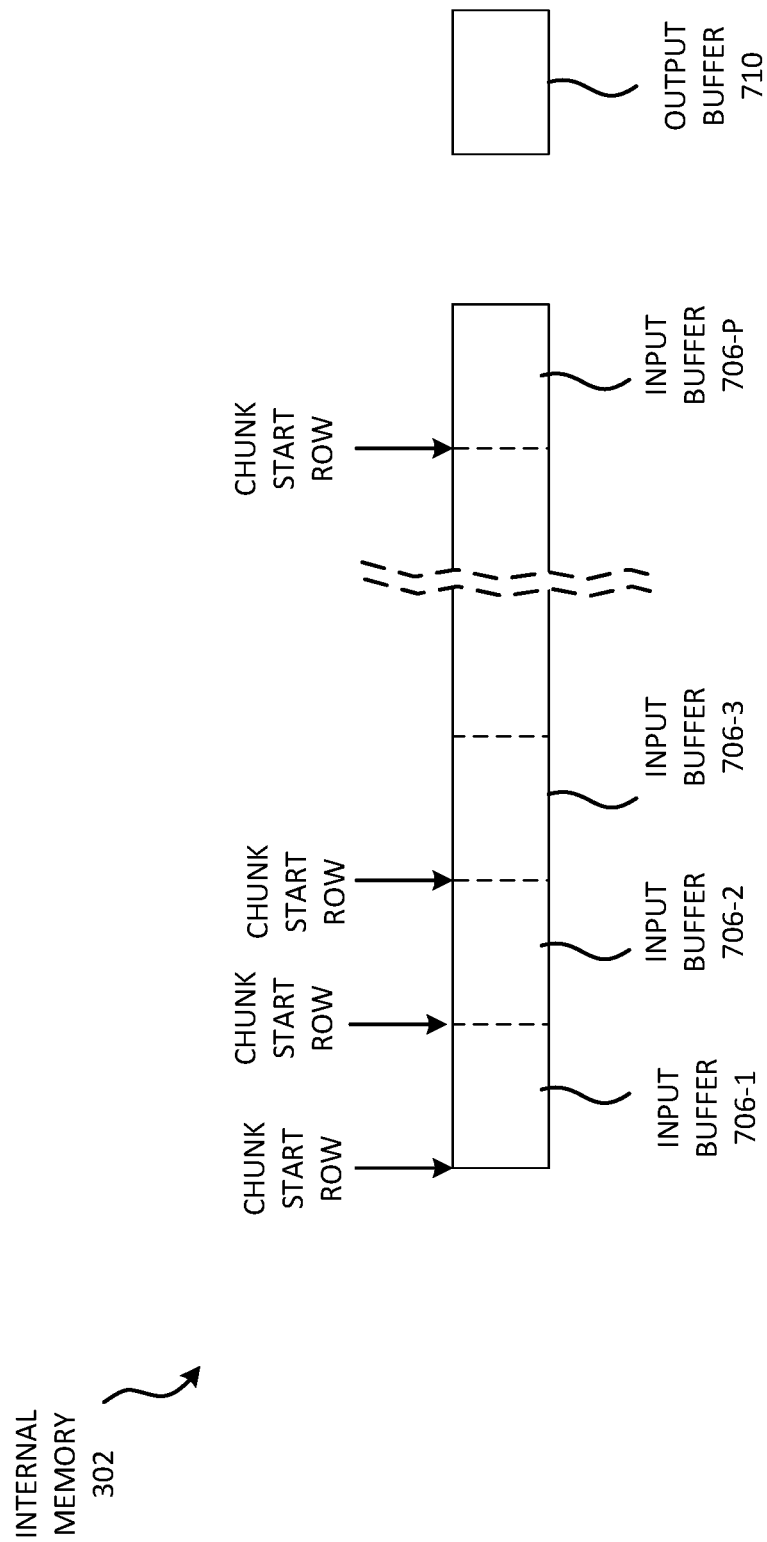

RESUMABLE MERGE SORT

BACKGROUND

Computers and computing systems have affected nearly every aspect of modern living. Computers are generally involved in work, recreation, healthcare, transportation, entertainment, household management, etc. These computing systems can employ database systems, which can be queried to retrieve results. To efficiently query the database, the database system may index and/or sort data stored in tables in the database.

BRIEF DESCRIPTION OF THE DRAWINGS

FIG. 3B is a block diagram of functional components stored in memory;

FIG. 4A is a block diagram of an exemplary unsorted dataset in one embodiment;

FIGS. 4B, 4C, 4D, and 4E are block diagrams of an exemplary side table in one embodiment;

FIG. 7A is a block diagram of volatile memory during a resumable merge in one embodiment;

DESCRIPTION

The following detailed description refers to the accompanying drawings. The same reference numbers in different drawings may identify the same or similar elements. Also, the following detailed description is exemplary and explanatory only and is not restrictive of the invention, as claimed.

As noted above, a database system may index and/or sort tables of data in the database. If a sort operation fails, much (if not all) of the work performed for the operation may be lost. As a result, the sort operation may have to restart from the beginning. Additionally, a sorting operation that executes as a single transaction may generate a large log, which some database systems may not be able to handle. As a result, the database system may not complete the transaction and will instead "roll back" or return the database table to its original state without completing the sort. Because sorting operations can take many hours to complete for large tables and consume a large amount of resources, having to restart a sorting operation from the beginning can be less than ideal.

Embodiments discussed below can implement database operations, such as the sorting of data in tables, that can be resumed after a system failure while reducing the loss of work. Some embodiments enable the user to manually pause and/or resume the sort. In yet other embodiments, a sort may be automatically paused and automatically resumed, such as when a server migrates to new hardware or fails over to new hardware. Some embodiments enable the configuration of the amount of work lost during a failure or pause of a sort so as to comply with a service-level agreement (SLA). Some embodiments enable the number of threads handling a sort to be scaled up or down without the loss of work (or minimizing the loss of work). Some embodiments may reduce the size of logs and/or length of transactions to limit rollback.

The embodiments described below relate to sorting tables in a relational database. The principles and concepts can be applied to an external sort other than in a relational database, for example. Further, the embodiments may be implemented in SQL SERVER™ or AZURE SQL SERVER™ available from MICROSOFT™ Corporation. The concepts described herein may be applied to other database offerings, or other data stores and/or data handling products in general.

Figure 1:
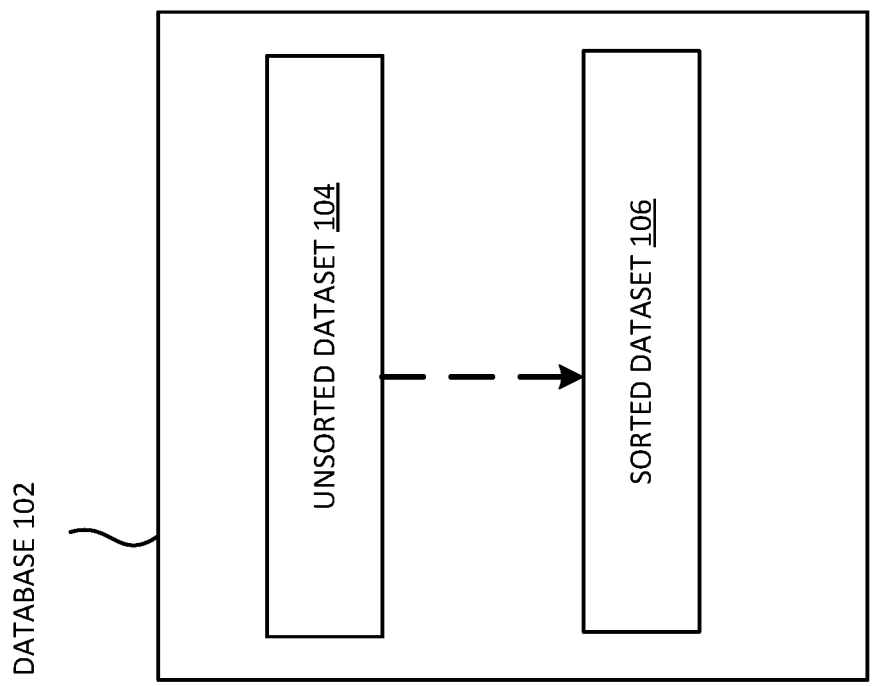
FIG. 1 illustrates a block diagram of a database with an unsorted dataset and a sorted dataset.

FIG. 1 illustrates a block diagram of a database 102 with an unsorted dataset 104. A user, application, component, or operation can initiate a sort operation on dataset 104 that causes a sorted dataset 106 to be created. In one embodiment, if the sort fails to complete, the sort may be resumed while reducing work lost (i.e., not necessarily starting the sort from the beginning). Alternatively, if the user manually pauses the sort operation, the user may resume the sort without the sort having to start from the beginning. A user may want to pause the sort operation, for example, to run other processes or operations. Also, a sort may be paused to migrate the sort operation from one server to another (i.e., to pause the sort operation on one server and resume it on another server). A user, application, component, or operation may also scale up or down the number of threads operating on a sort either without losing work or without having to start the sort from the beginning.

Figure 2:
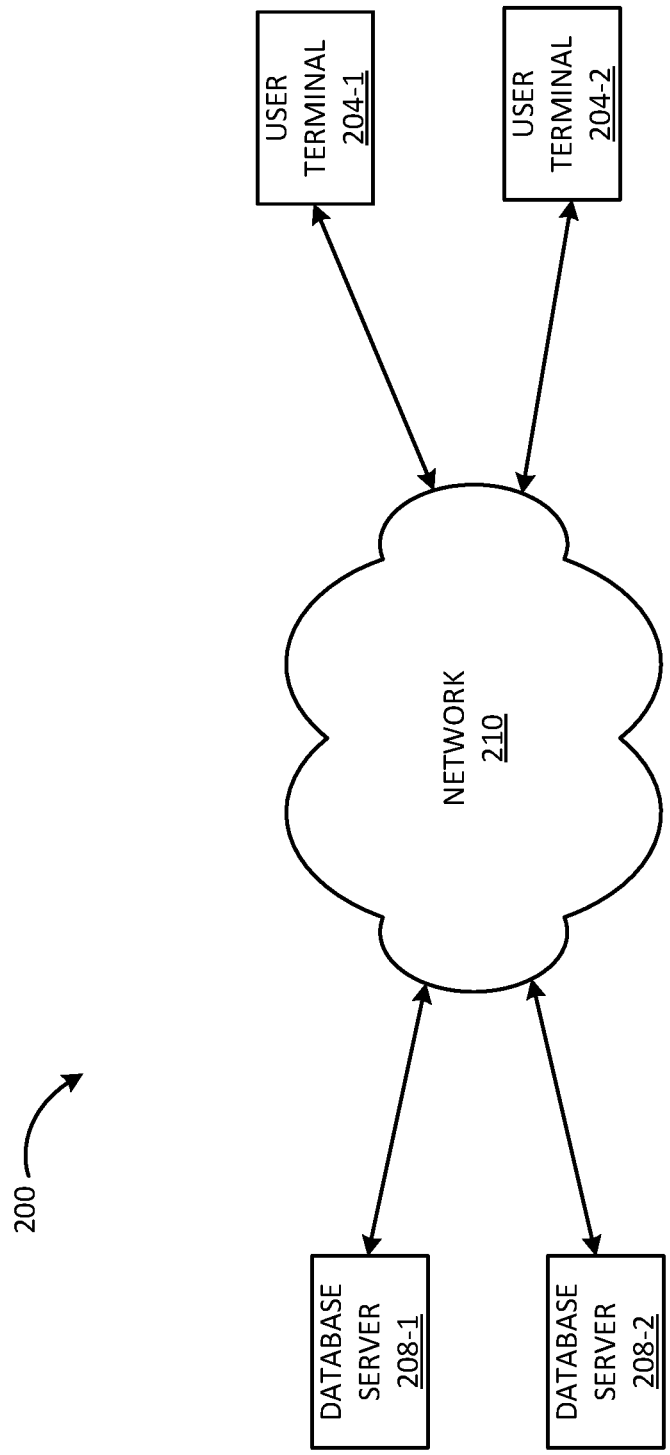
FIG. 2 is a block diagram of a system including database servers and user terminals.

FIG. 2 is a block diagram of a system 200 including database servers 208 (individually database server 208-x) and user terminals 204 (individually user terminals 204-x). Each terminal 204-may execute instance of an application. A user may interact with the application to access data stored in database server 208-x. Queries and/or commands generated by the instances of the application are routed through network 210 to database server 208-x. For example, the user may submit a query and/or command via the application executing on terminal 204-x, thereby causing database server 208-x to sort a table. Alternatively, database server 208-x may issue a sort command itself as part of a larger operation on a data table (such as the generation of an index). Database server 208 executes the sort operation and generates metadata during the sort such that the sort may be resumed after a pause or failure. Sort results are sent back to the requesting process or application.

Figure 3A:
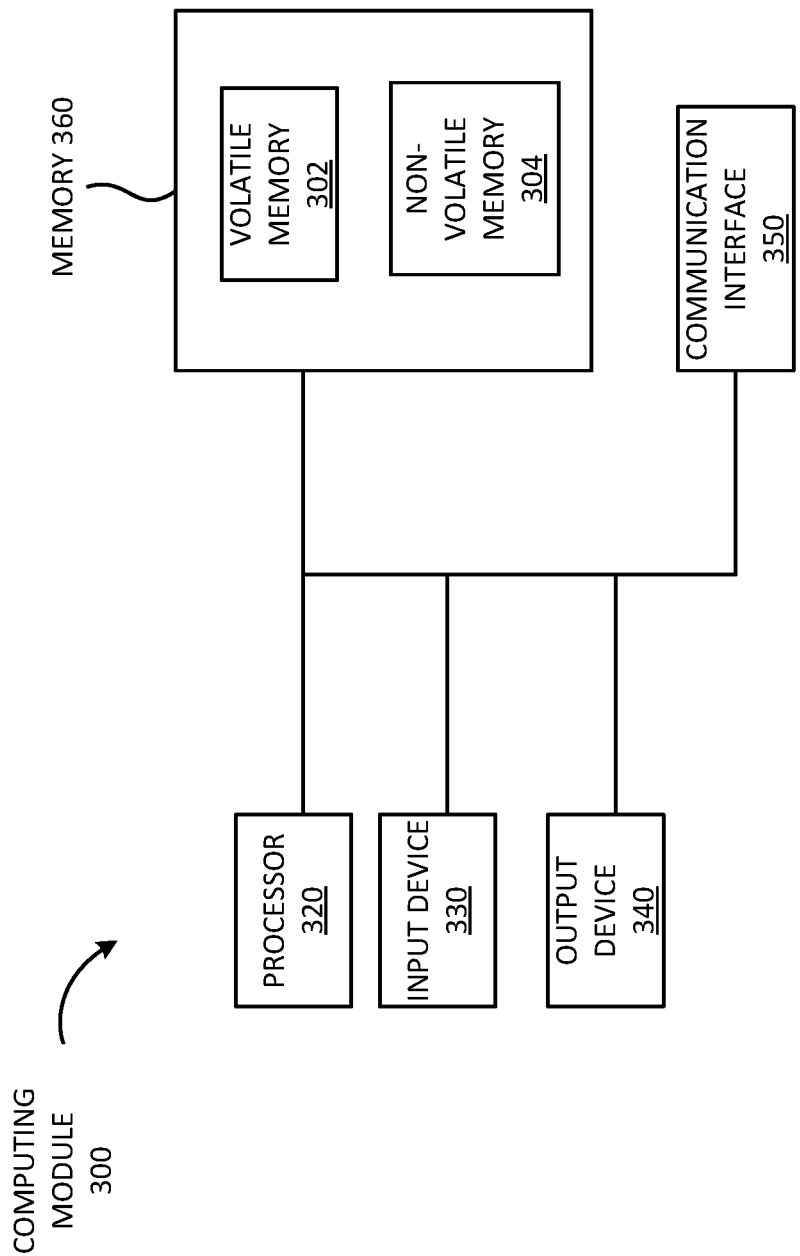
FIG. 3A is a block diagram of exemplary components of a computing module.

Devices in system 200 (such as servers 208 and/or terminals 204) may each include one or more computing modules. FIG. 3A is a block diagram of exemplary components of a computing module 300. Computing module 300 may include a memory, a processor 320, a communication interface 350, an input device 330, and an output device 340.

Memory 360 may include nonvolatile memory 304. Nonvolatile memory 304 may retain data even if there is an interruption in the power that powers memory 360, for example. Nonvolatile memory 304 may also be referred to as external memory, auxiliary memory, secondary storage, and/or secondary memory. Nonvolatile memory 304 may include a magnetic disk, a hard disk drive (HDD), optical discs, flash memory, a solid-state drive (SSD), and/or magnetic tape for example.

Memory 360 may also include volatile memory 302. In some embodiments discussed below, volatile memory 302 loses data when there is an interruption in the power the powers memory 360, for example. Volatile memory 302 may be faster to read from or write to than nonvolatile memory 304; and processor 320 may have more direct access to volatile memory 302 as compared to nonvolatile memory 304.

Memory 360 may store, among other things, information and instructions (such as applications and an operating system) and data (such as data tables) for use by processor 320. FIG. 3B is a block diagram of functional components stored in memory 360. As shown in FIG. 3A memory 360 may include an operating system 376, a database management system (DBMS) 374, a database 102, and a resumable-sort component 380 (or "sort component 380" or "sort operator 380"). The sort performed by sort component 380 may be referred to as sort operation 380.

Operating system 376 may include software instructions for managing hardware and software resources of computing module 300. For example, operating system 376 may include WINDOWS™, Linux, Solaris, OS X, iOS, Android, and/or an embedded operating system.

An application may include, for example, database management system 374 that operates on data tables. System 374 may include SQL SERVER™ or AZURE SQL SERVER™ available from MICROSOFT™ Corporation. System 374 may also include other database systems, or other data stores and/or data handling products.

Database 102 (also shown in FIG. 1) includes unsorted dataset 104 and sorted dataset 106. Resumable-sort component 380 acts on unsorted dataset 104 to generate sorted dataset 106. As described herein, resumable-sort component 380 may enable a user or another application or system to pause and resume the sort operation while minimizing lost work (such as not having to restart the sort operation from the beginning). Resumable-sort component 380 may also enable the resumption of a sort operation from a previous failure while minimizing lost work (such as not having to restart the sort operation from the beginning). Resumable-sort component 380 may also enable the configuration of the amount of work lost during a failure or pause so as to comply with a SLA. Resumable-sort component 380 may also enable the scaling up or down of the number of threads operating to sort dataset 204.

Processor 320 may include any type of processor or microprocessor (or families of processors or microprocessors) that interprets and executes instructions. In other embodiments, processor 320 may include an application-specific integrated circuit (ASIC), a field-programmable gate array (FPGA), etc.

Communication interface 350 may include a network interface card, e.g., Ethernet card, for wired communications or a wireless network interface (e.g., a WiFi) card for wireless communications. Communication interface 350 may include a transceiver (receiver and/or transmitter) that enables computing module 300 to communicate with other devices or systems. As noted above, interface 350 allows devices to communicate with other devices through network 210. Network 210 may include one or more packet switched networks, such as an Internet protocol (IP) based network, a local area network (LAN), and/or a wide area network (WAN).

Input device 330 may allow a user to input information into computing module 300. For example, user terminals 204-x may include input device 330, such as a keyboard, a mouse, a pen, a touch-screen display, a microphone, and/or a camera. Some devices in system 200, such as database server 208-x, may be "headless" and may not include input device 330 (such as a keyboard).

Output device 340 may output information to the user. For example, user terminals 204 may include an output device 340 such as a display, a printer, a speaker, etc. Headless devices, such as database servers 108 may not have output device 340.

Input device 330 and output device 340 may allow a user to activate and interact with a particular service or application, such as a web browser or an application to interface with DBMS 374 and/or resumable-sort component 380. Input device 330 and output device 340 may allow a user to receive and view a menu of options and select from the menu options. The menu may allow the user to select various functions or services associated with applications executed by computing module 300.

Computing module 300 may include other components (not shown) that aid in receiving, transmitting, and/or processing data. Moreover, other configurations of components in computing module 300 are possible.

Computing module 300 may perform the operations described herein in response to processor 320 executing software instructions stored in a non-transient computer-readable medium, such as memory 360. A computer-readable medium may include a tangible and/or physical memory device. The software instructions may be read into memory 360 (such as volatile memory 302) from another computer-readable medium (such as nonvolatile memory 304) or from another device via communication interface 350. The software instructions stored in memory 360 may cause processor 320 to perform processes that are described herein.

As discussed with respect to FIG. 1, system 374 may input an unsorted dataset 104 to generate a sorted dataset 106. FIG. 4A is a block diagram of an unsorted dataset 402 that has numerous rows. Dataset 402 may be stored, for the most part, in nonvolatile memory 304, although portions of dataset 402 may be stored in volatile memory 302. In the examples described below, dataset 402 is sufficiently large that loading the entirety of dataset 402 into volatile memory 302 is not feasible (although embodiments described herein are not necessarily limited in this way). To facilitate sorting, dataset 402 may be read from nonvolatile memory 304 to volatile memory 302 in chunks. As shown in FIG. 4A, dataset 402 is logically divided into chunks 404-1 through 404-M (individually "chunk 404-x" and collectively "chunks 404"). The size of chunks 404 is such that a chunk 404-x may be loaded into volatile memory 302, for example, for sorting. Each chunk 404 may have a length of N records. In one embodiment, the start and length of each chunk 404-1 may be determined as dataset 402 is being read from nonvolatile memory 304 into volatile memory 302. Like dataset 402, the rows of chunks 404 are also unsorted in this example.

In one embodiment, an unsorted chunk 404-x from unsorted dataset 402 (also referred to as "table") is read into volatile memory 302 and sorted to generate a corresponding sorted chunk, which is then written to nonvolatile memory 304 as part of a side table. FIG. 4B is a block diagram of such a side table 412 in one embodiment having multiple sorted chunks 414. In this example, sorted chunk 414-1 may correspond to unsorted chunk 404-1 (e.g., the data in chunk 414-1 is the same as chunk 404-1, but the data in chunk 414-1 is sorted). Likewise, sorted chunk 414-2 may correspond to unsorted chunk 404-2, etc. Such a strict correspondence is not necessary, however. Like dataset 402, side table 412 may also be too large to be loaded into volatile memory 302 in this example. Thus, side table 412 may also be logically divided into chunks 414-1 through 414-M (individually "chunk 414-x" and collectively "chunks 414"). While each chunk 414-x may be sorted (within the chunk), side table 412 itself may not be sorted. Creation of side table 412 (with sorted chunks 414), however, may be referred to as the "input" or "scanning" phase of a sort operation to generate a fully sorted dataset (such as sorted dataset 106).

Figure 4C:
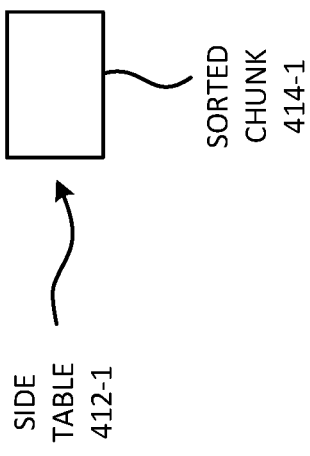
Figure 4D:
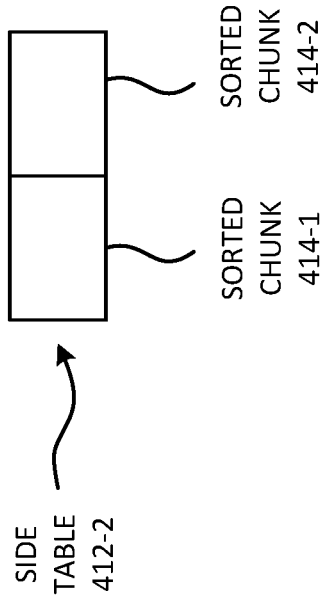
Figure 4E:
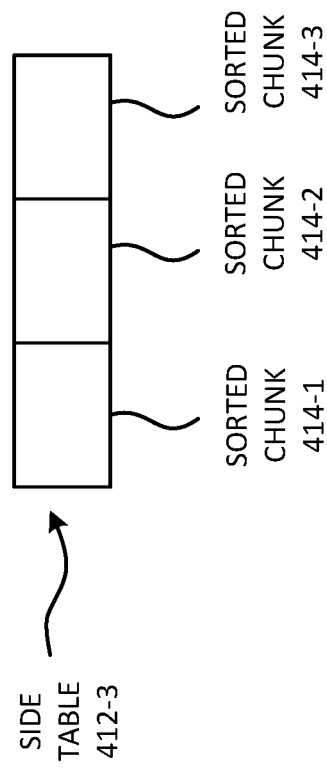

Side table 412 may be created one chunk at a time, or one "sort run" at a time. FIGS. 4C, 4D, and 4E show side table 412 in different states with different numbers of sorted chunks 414. In FIG. 4C, side table 412-1 includes only one sorted chunk 414-1. In FIG. 4D, side table 412-2 includes two sorted chunks (chunk 414-1 and chunk 414-2). In FIG. 4E, side table 412-3 includes three sorted chunks 414. As described in more detail below, sorted chunks 414 may be merged to create a fully sorted dataset (such as sorted dataset 106 generated from unsorted dataset 104). This latter phase of sort operation 380 may be referred to as the "output" or "merging" phase of a sort operation to generate the fully sorted dataset (such as sorted dataset 106).

Figure 5A:
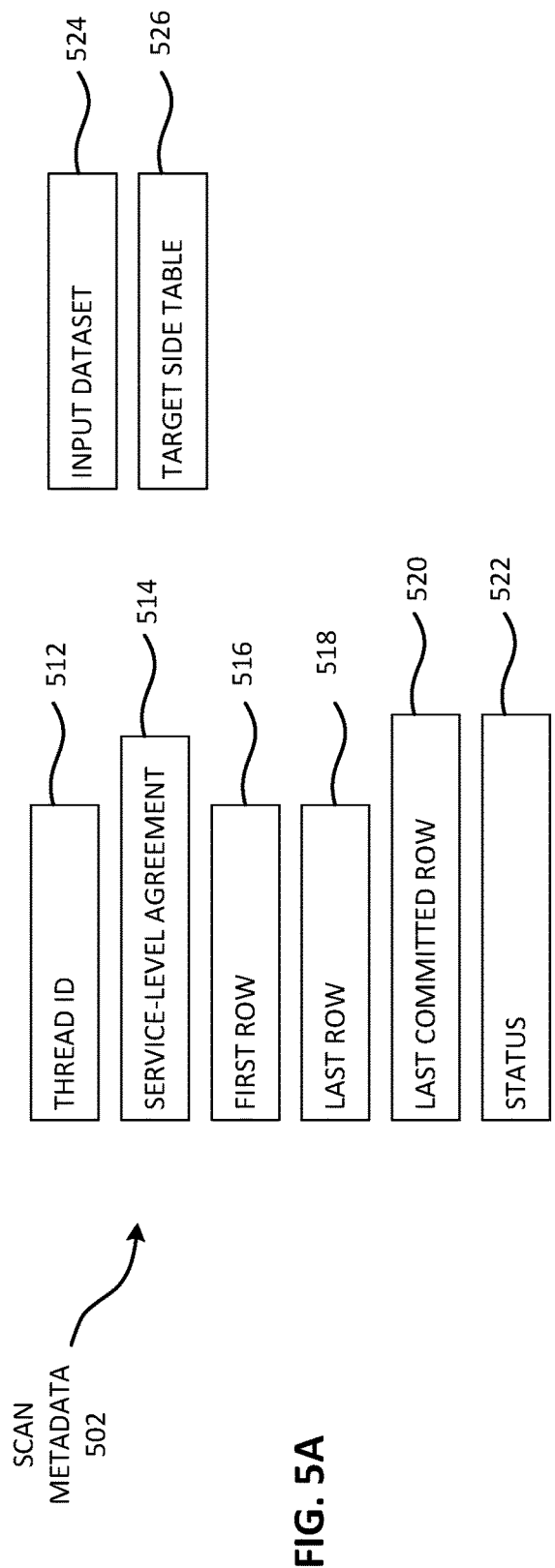
FIGS. 5A, 5B, 5C, and 5D are block diagrams of metadata that may be used for a resumable sort run in one embodiment.

During the input or scanning phase, sorting operation 380 may store (or persist) metadata (or state information) so as to be able to resume a paused or failed sort. For example, sorting operation 380 may store or persist metadata in nonvolatile memory 304. FIG. 5A is a block diagram of scan metadata 502 associated with the input phase of the sorting operation to facilitate the ability to resume a sort in one embodiment. Scan metadata 502 enables persisting of the state of the sort operation related to the input or scan phase of sort operation 380. As shown in FIG. 5A, scan metadata 502 includes a THREAD ID field 512, an SLA field 514, a FIRST ROW field 516, a LAST ROW field 518, a LAST COMMITTED ROW field 520, a STATUS field 522, an INPUT DATASET field 524, and a TARGET SIDE TABLE field 526. The fields shown in scan metadata 502 are one example in one embodiment. In other embodiments, additional fields, fewer fields, or a different arrangement of fields may be used. In another embodiment, for example, SLA field 514 is omitted as described in more detail below.

THREAD ID field 512 identifies the thread associated with scan metadata 502. In some embodiments, more than one computing thread may be used to sort dataset 402. In this case, dataset 402 may include multiple groups of chunks 404, each group of chunks identified for a different thread to sort. For example, one thread may sort chunks 404-1 through 404-10 and a second thread may sort chunks 404-11 through 404-M. Each thread processing dataset 402 may be associated with its own scan metadata 502. Additional metadata may be used to keep track of the multiple threads.

Figure 5B:
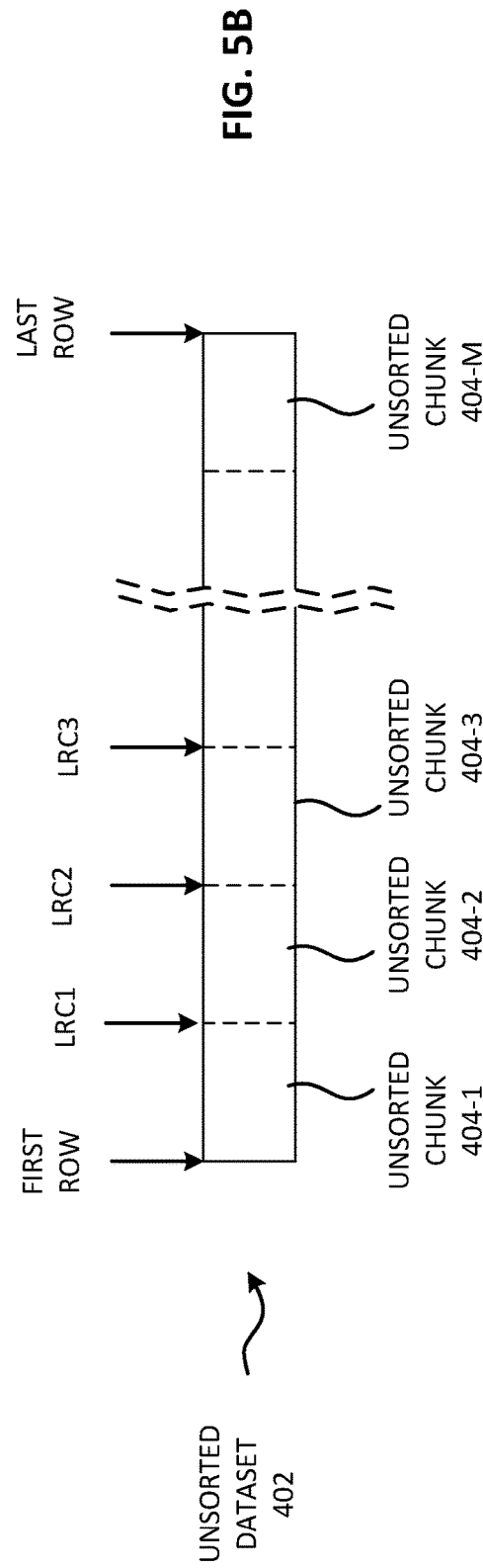

FIRST ROW field 516 identifies the first row in dataset 402 for the thread identified in THREAD ID field 512 to sort. LAST ROW field 518 identifies the last row in dataset 402 for the thread identified in THREAD ID field 512 to sort. As shown in FIG. 5B, if there is only one thread to sort dataset 402, then FIRST ROW field 516 points to the first row in dataset 402 and LAST ROW field 518 points to the last row in dataset 402.

SLA field 514 may indicate the maximum size of a chunk 404-x to be loaded from nonvolatile memory 304 into volatile memory 302 for the corresponding thread to begin sorting. SLA field 514 may specify a number of rows, for example. In the examples below, the chunk size is assumed to be N rows. Rather than defining the maximum chunk size to be as large as possible to fit into volatile memory, a smaller maximum size may be defined. For example, the maximum chunk size may be determined based on the amount of work that could be lost if the sort operation is paused or fails. That is, just because volatile memory 302 is very large does not necessarily mean that the maximum chunk size is equally as large. Instead, the maximum chunk size may be selected to minimize lost work in the event of a pause (or failure) while still allowing for efficiency in the sort operation. The maximum size of the chunk may be selected to comply with an SLA that defines the amount of work (measured, for example, in time) that can be lost when a sort fails or is paused. As noted above, SLA field 514 may be omitted in one embodiment and the maximum chunk size can be determined as unsorted dataset 402 is being read from nonvolatile memory 304.

STATUS field 522 may indicate whether the thread identified in THREAD ID field 512 has sorted all the chunks 404 between the first row and the last row (identified in FIRST ROW field 516 and LAST ROW field 520, respectively) and committed the sorted chunks 414 to side table 412. STATUS field 522 may include a Boolean value with TRUE indicating completion and FALSE indicating incompletion, for example. In another embodiment, STATUS field 522 may also specify the stage of the sort thus far completed by the thread identified in THREAD ID field 522. For example, STATUS field 522 may specify that sorting of chunks 404 have been completed (and committed) (the input phase) and that a merge is in process (the output phase).

LAST COMMITTED ROW field 520 stores the progress (the state such as the row) of the respective thread in sorting chunks 404 in dataset 402. In one embodiment, LAST COMMITTED ROW field 520 identifies the last row of the last chunk in dataset 402 that has been read in, sorted, and committed to side table 412 (assuming that dataset 402 is being read sequentially). Therefore, LAST COMMITTED ROW field 520 may be updated with each commitment of a sorted chunk 414-x to side table 412. If all unsorted chunks 404 have been sorted and committed to side table 412, then LAST COMMITTED ROW field 520 should indicate the last row of the last chunk 404-M (or the LAST ROW field 518). Should a sort be interrupted, however, then LAST COMMITTED ROW field 520 may be used to resume a sort of dataset 402 starting with chunk 404-x following the chunk 404-x that ends with last committed row. In other embodiments, other information may be stored in scan metadata 502 to indicate the state of progress of the respective thread in sorting chunks 404 in dataset 402 (such as when the thread does not sort chunks 404 sequentially, the committed chunks may be specified).

INPUT DATASET field 524 identifies the dataset to sort, such as unsorted dataset 402. TARGET SIDE TABLE field 526 identifies the side table to write sorted chunks to, such as side table 412. Because multiple side tables may be used, TARGET SIDE TABLE field 526 helps identify the appropriate one to write to. Multiple side tables may be used, for example, because of multiple threads running or because of multiple levels of merging (such as intermediate merges). These fields may be used to resume sort on unsorted dataset 402 which is operating on side table 412.

As noted above, the fields shown in scan metadata 502 are one example in one embodiment. In other embodiments, additional fields, fewer fields, or a different arrangement of fields may be used. For example, CHUNK SIZE field 454 may be omitted; and/or THREAD ID field 512 may be omitted if only one thread is processing unsorted dataset 402.

Figure 5C:
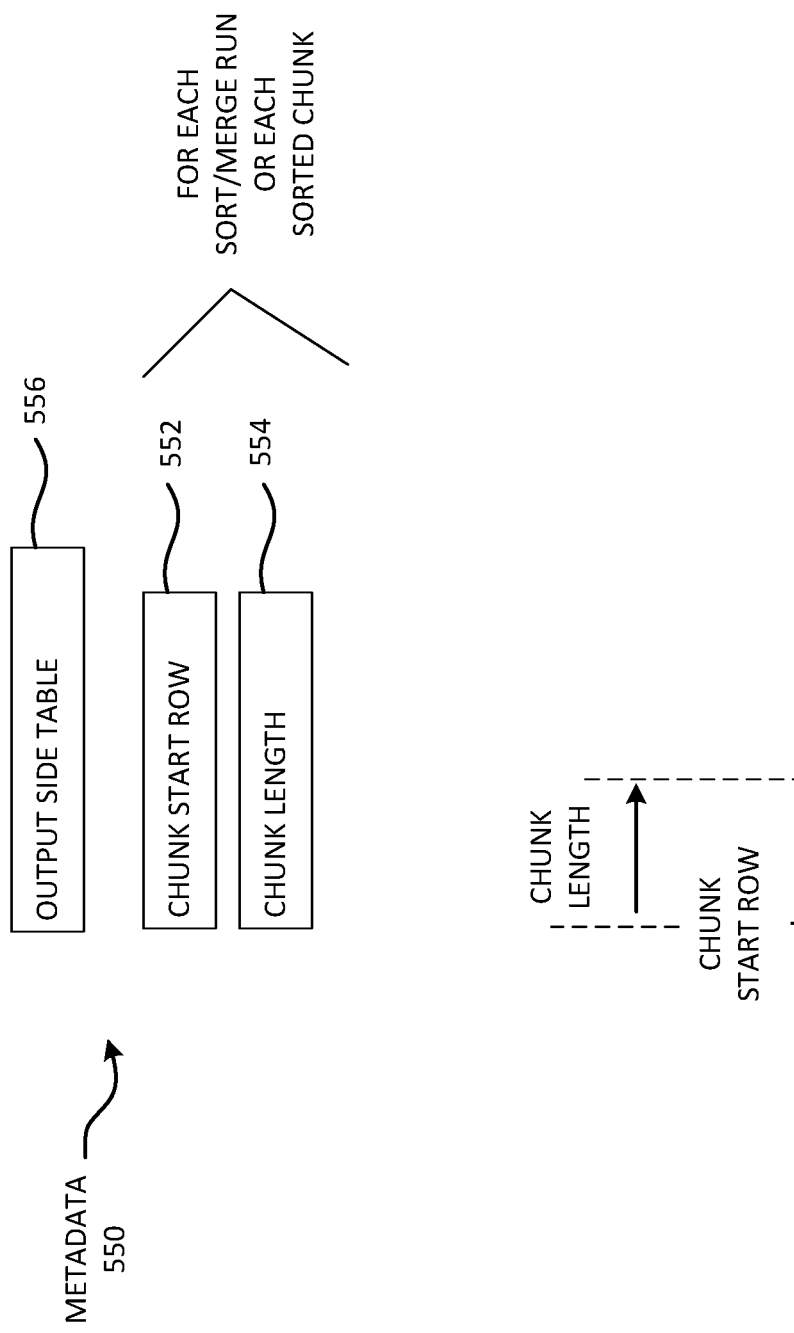
Figure 5D:
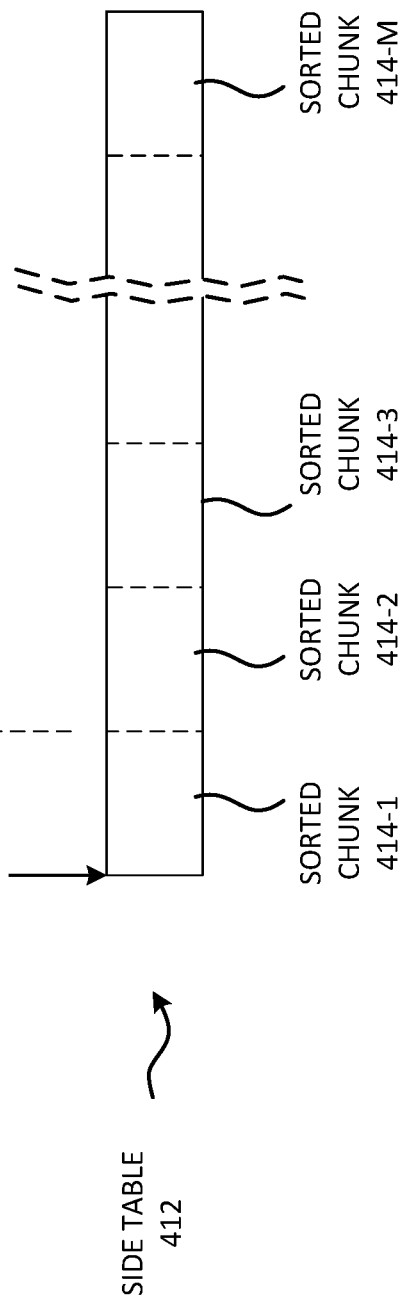

As resumable-sort component 380 writes to side table 412, it keeps track of sorted chunks (such as the start, length, and/or end row of each chunk). FIG. 5C is a block diagram of metadata 550 associated with each chunk of side table 412. As shown in FIG. 5C, metadata 550 includes a CHUNK START ROW field 552, a CHUNK LENGTH field 554, and a TARGET SIDE TABLE field 556. The fields shown in metadata 550 are one example in one embodiment. In other embodiments, additional fields, fewer fields, or a different arrangement of fields may be used.

CHUNK START ROW field 552 identifies the first row in the corresponding chunk of data in side table 412. CHUNK LENGTH field 554 identifies the length of the corresponding chunk of data in side table 412. As noted above, side table 412 may be created one chunk at a time, or one "sort run" at a time. If side table 412 includes one chunk (see FIG. 4C), then metadata may include a list of CHUNK START ROW fields 552 and CHUNK LENGTH field 554, one pair of fields for each chunk 414-$x$.

OUTPUT SIDE TABLE field 556 identifies the side table to write sorted chunks to, such as another side table similar to side table 412. Because multiple side tables may be used (for multiple threads operating on the same dataset or multiple levels of merge), OUTPUT SIDE TABLE 556 helps identify the appropriate one to write to. In one embodiment, OUTPUT SIDE TABLE 556 may be used to specify that output is not to another side table, but to the requesting user, operation, or component and a new set of metadata 550 for an output side table may not be necessary. Outputting to the requesting user, operation, or component may be part of the sort operation referred to as the "final merge."

Figure 6:
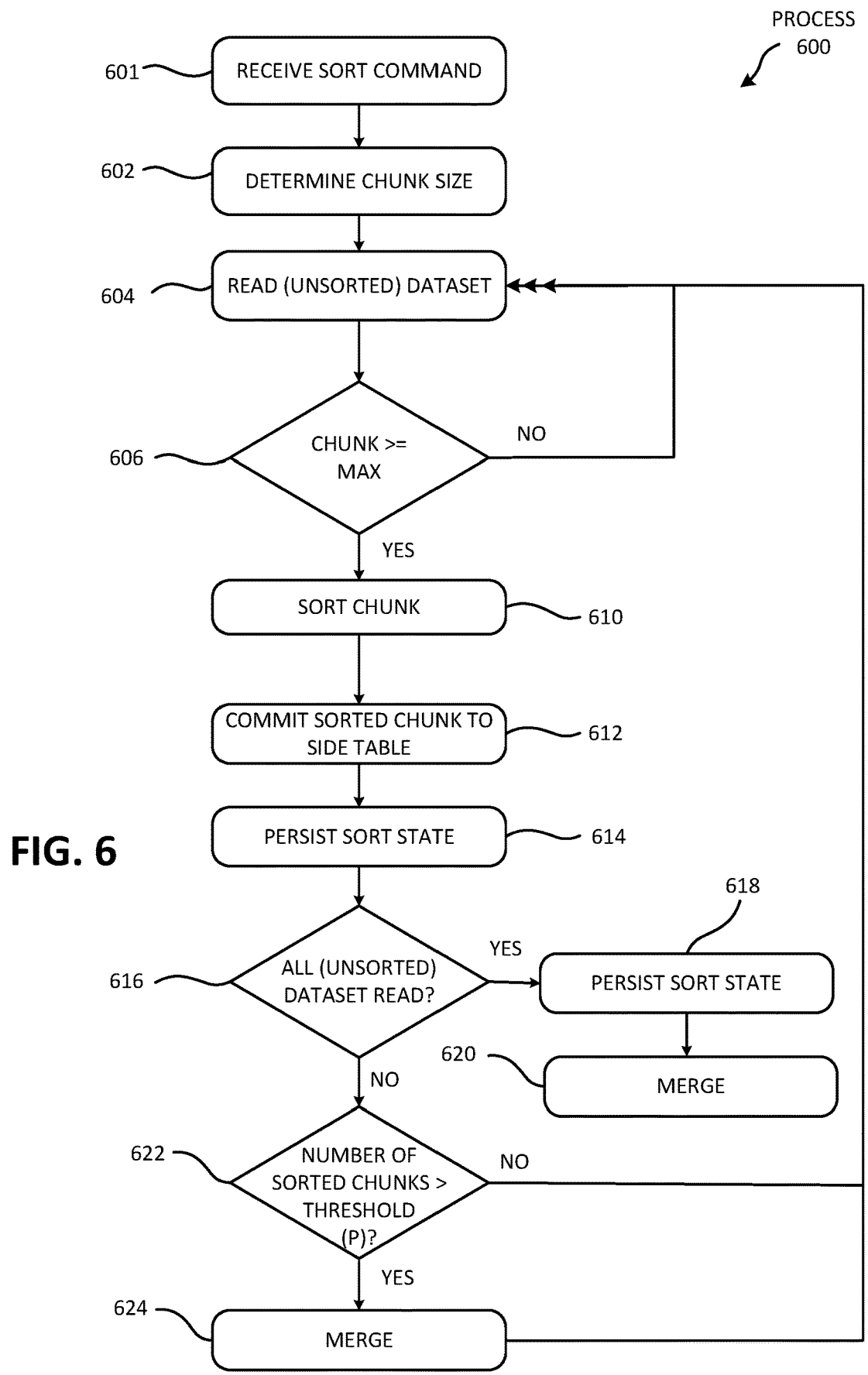
FIG. 6 is a flowchart of an exemplary resumable sort in one embodiment.

FIG. 6 is a flowchart of an exemplary process 600 for performing a resumable-sort in one embodiment. Process 600 may be performed by resumable-sort component 380 running in database management system 374 in processor 320, for example. Process 600 may be just one thread executing to sort unsorted dataset 402. In this example, resumable-sort component 380 may start process 600 because it receives a sort command (act 601) from database management system 374.

Process 600 may continue with the determination of the maximum size of a chunk of data (act 602). In one implementation, process 600 reads scan metadata 502 (SLA field 514) to determine that the maximum chunk size is N rows. In another implementation, process 600 determines the maximum size of a chunk on other factors. The smaller the size of chunks 404, the less work is lost in the event of a failure. On the other hand, a small chunk size may lead to additional (more than one) merge steps and therefore additional input/output between volatile and nonvolatile memory. For example, process 600 can determine the largest number of unsorted chunks 404 that unsorted dataset 402 can be split into while still avoiding the need for an intermediate merge. In other words, process 600 may determine the smallest number of rows in an unsorted chunk 404 without incurring an additional intermediate merge. As such, process 600 may avoid input/output to/from volatile/nonvolatile memory 302/304 associated with an extra merge while reducing the work lost in the event of a sort failure.

In one embodiment, process 600 determines the smallest size of an unsorted chunk 404-$x$ while avoiding an additional (second) merge. If the determined size of the chunk is too big (would incur too large a loss of work as compared to the SLA in the event of a failure), then process 600 determines the smallest size of an unsorted chunk 404-$x$, with one additional (second) merge, while avoiding a third merge. If the determined size of the chunk is still too big (would incur too large a loss of work as compared to the SLA in the event of a failure), then process 600 determines the smallest size of an unsorted chunk 404-$x$, with two additional (second and third) merge sorts, while avoiding a fourth merge sort. These steps for determining the chunk size may be repeated until the chunk size is determined that meets the SLA in the event of a failure (or pause). The SLA may be determined by reading SLA field 514 in scan metadata 502, for example.

Process 600 continues with the reading of data from unsorted dataset 402 (act 604). For example, unsorted dataset 402 (shown as chunk 404-$x$) may be read from nonvolatile memory 304 to volatile memory 302. Process 600 continues with the reading of data from dataset 402 (act 604) until the size of the chunk reaches the appropriate maximum (act 606: YES). For example, the appropriate maximum may be the maximum chunk size (determined in act 602). Alternatively, if the maximum chunk size (determined at act 602) is larger than available volatile memory 302, then reading of chunk 404-$x$ may be cut short, effectively making for a smaller chunk 404-$x$ than specified by the maximum chunk size (in act 602).

Process 600 continues with the sorting of unsorted chunk 404-$x$ to generate sorted chunk 414-$x$ (act 610). Any number of sorting algorithms may be used to sort chunk 404-$x$ in volatile memory 302, such as quicksort or mergesort. When sorting of chunk 404-$x$ is complete, process 600 may commit sorted chunk 414-$x$ to side table 412 (act 612). More generally, sorted chunk 414-$x$ is persisted to memory, such as being written to nonvolatile memory 304 (act 612). Committing may include issuing a COMMIT command in SQL and/or writing the sorted chunk 414-$x$ to non-volatile memory. As such, an intermediate result of sort operation 380 (a sorted first portion or chunk) is persisted (such as to nonvolatile memory 304).

Along with the committing of sorted chunk 414-$x$ (act 612) to side table 412, the state of the sort is persisted (act 614) (such as by updating data stored in scan metadata 502 and metadata 550) (act 614). Persisting the state of the sort identifies the portions of the sort operation that have been successfully performed (and persisted). For example, if one chunk has been sorted and committed to side table 412 (see FIG. 4C), then LAST COMMITTED ROW field 520 may be updated to point to the last row of unsorted chunk 404-1 (LRC1 in FIG. 5B). If two chunks have been sorted and committed to side table 412 (see FIG. 4D), then LAST COMMITTED ROW field 520 may be updated to point to the last row of unsorted chunk 404-2 (LRC2 in FIG. 5B). Further, a record may be added to the metadata 550. In this example, sort operation 380 adds a value for the first row of sorted chunk 414-$x$ committed to side table 412 (in CHUNK FIRST ROW field 552), and the length of the sorted chunk 414-$x$ committed to side table 412 (in CHUNK LENGTH field 554). If metadata 550 does not yet exit, it is created.

If the entire unsorted dataset 402 has been read and sorted (in chunks) (act 616: YES), then the state of the sort may be persisted (act 618). For example, STATUS field 522 may be updated to indicate that all of unsorted dataset 402 has been read, sorted, and committed in chunks 414 to side table 412 and that the sort operation 380 has proceeded to the merge or output phase (act 620). The merge portion of resumable-sort operation 380 is discussed in more detail below with respect to FIG. 8.

In some instances, sorted chunks 414 may be merged before completion of reading the entire unsorted dataset 402 into volatile memory 302 (act 616: NO) chunk by chunk for sorting. As shown in FIG. 6, if the number of sorted chunks 414 has reached a threshold (act 622: YES), then process 600 may proceed to merge some of the sorted chunks 414 (act 624). The merge portion of resumable-sort operation 380 is discussed in more detail below with respect to FIG. 8. Since not all of the unsorted dataset 402 has been read and sorted (act 616: NO), after merge (act 624) process 600 will continue to read unsorted dataset 402 (returning to act 604).

If data in unsorted dataset 402 remains to be read into volatile memory 302 (act 616: NO), then process 600 may continue to read unsorted dataset 402 (act 604), sort and commit chunks (acts 610 and 612), and persist the state (act 614). On the other hand, if all chunks have been sorted, then process 600 may continue to a final merge (act 626).

Process 600 effectively divides a sort operation into a plurality of portions (such as chunks to be sorted), performs a sort operation on each portion (such as sorting a first portion or chunk), persists results (intermediate results) of the sort of that portion (such as the sorted first portion or chunk), and persists a state of the sort operation that identifies the portions of the sort operation that have been performed. As described in more detail below, this may enable the sort operation to be resumed after failure or pause.

Process 600 may be described as reading a plurality of unsorted chunks 404 of the unsorted dataset 402 from nonvolatile memory 304 into volatile memory 302; sorting each of the plurality of unsorted chunks 404 to generate a corresponding plurality of sorted chunks 414; persisting the corresponding plurality of sorted chunks 414 to nonvolatile memory 304; and/or persisting metadata (first metadata) (such as a pointer to unsorted dataset 402) indicating the portion that corresponds to the persisted sorted chunks 414. Persisting the corresponding plurality of sorted chunks to the nonvolatile memory may include committing the corresponding plurality of sorted chunks to a side table. Reading the plurality of unsorted chunks may include reading the unsorted chunks to a maximum chunk size based on a service level agreement.

Should sort operation 380 be paused (such as in a failure), then the operation may be resumed based on the persisted state, such as scan metadata 502 and/or metadata 550. Resuming sort operation 380 is discussed in more detail below with respect to FIG. 9.

FIG. 7A is a block diagram of buffers in volatile memory 302 for a merge in one embodiment. As shown in FIG. 7A, volatile memory 302 may have input buffers 706 (individually input buffer 706-x) and an output buffer 710. Each input buffer is associated with a particular size (specified in rows, for example). Output buffer 710 is also associated with a size (specified in rows, for example). In some implementations, the size of input buffer 706 and the size of output buffer 710 are smaller than the size of chunks 414. Sorted chunks 414 are read and stored in input buffers 706. Each input buffer 706-x is associated with the first row of a chunk (as identified in CHUNK START ROW field 552 of the corresponding chunk) and a chunk length (as identified in CHUNK LENGTH field 554 of the corresponding chunk). In a different implementation, each input buffer 706-x is associated with a last-row merged pointer (rather than a chunk length pointer).

Figure 7B:
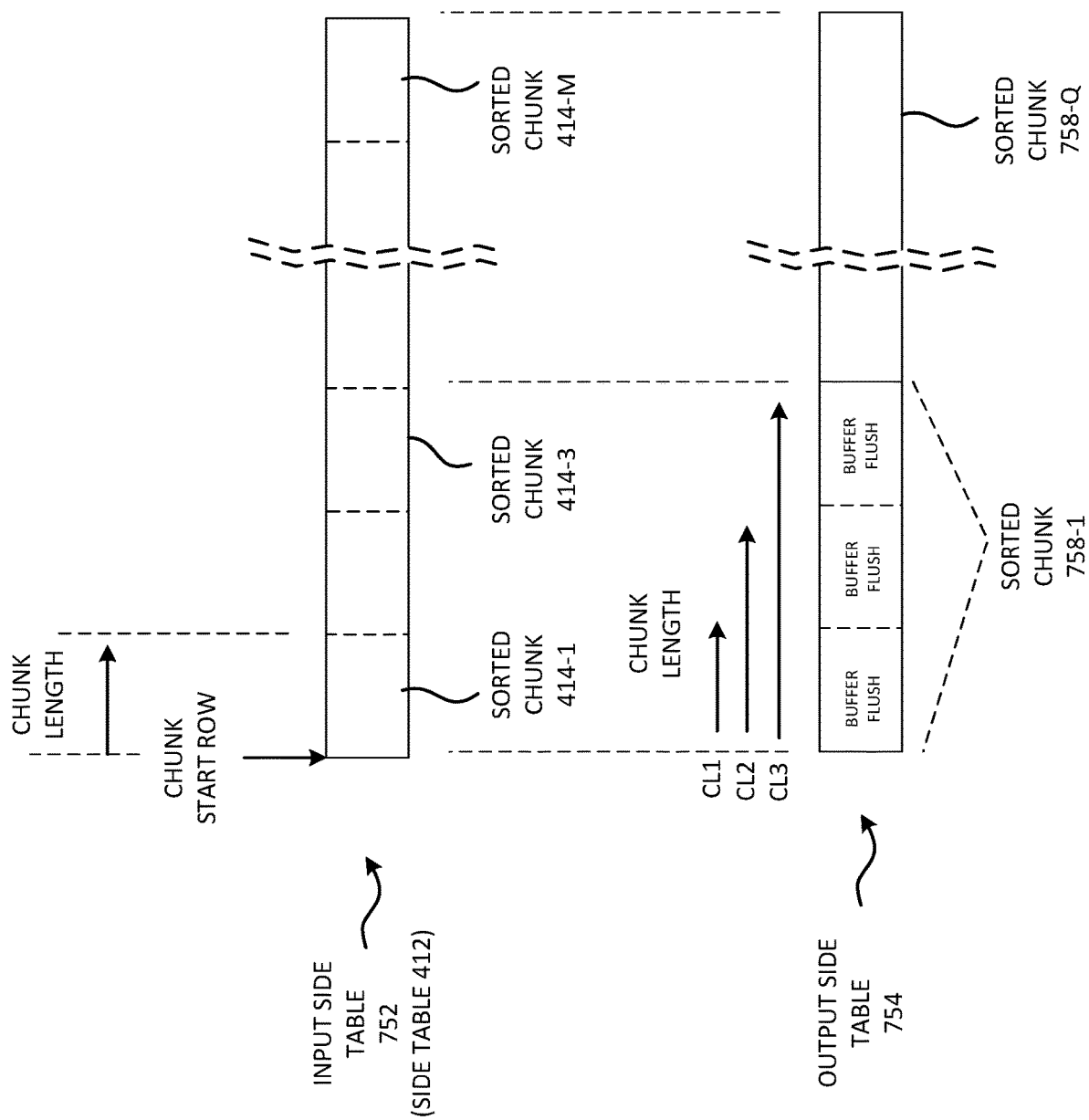
FIG. 7B is a block diagram of an input side table having been merged into an output side table.

In the example of FIG. 7A, volatile memory 302 has P input buffers and one output buffer 710. Input buffer 706-1 stores rows from sorted chunk 414-1; input buffer 706-2 stores rows from sorted chunk 414-2; etc. Sort component 380 may repeatedly select rows from input buffers 706 (such as the row with the least value) and insert that row into output buffer 710. Each time a row is copied from an input buffer 706-x to output buffer 710, the corresponding start row (in CHUNK START ROW field 552) may be incremented and the corresponding chunk length (CHUNK LENGTH field 554) is reduced to mark progress of the merge sort. FIG. 7B is a block diagram showing side table 412 (input side table 752) having been merged into a new (or output) side table 754. As shown in FIG. 7B, chunks 414-1, 414-2, and 414-3 of side table 412 (or input side table 752) have been merged into chunk 758-1 of output side table 754. Chunks 414-4 through 414-M of side table 412 (or input side table 752) have been merged into chunk 758-Q of output side table 754. Chunks 758 are internally sorted, but side table 754 itself may not be sorted. Like side table 412, side table 754 may be associated with metadata defining the chunks 758 (such as the start row in CHUNK START ROW field 552 and length in CHUNCK LENGTH field 554 of each chunk) and side table 754 may be identified by OUTPUT SIDE TABLE field 556.

Figure 8:
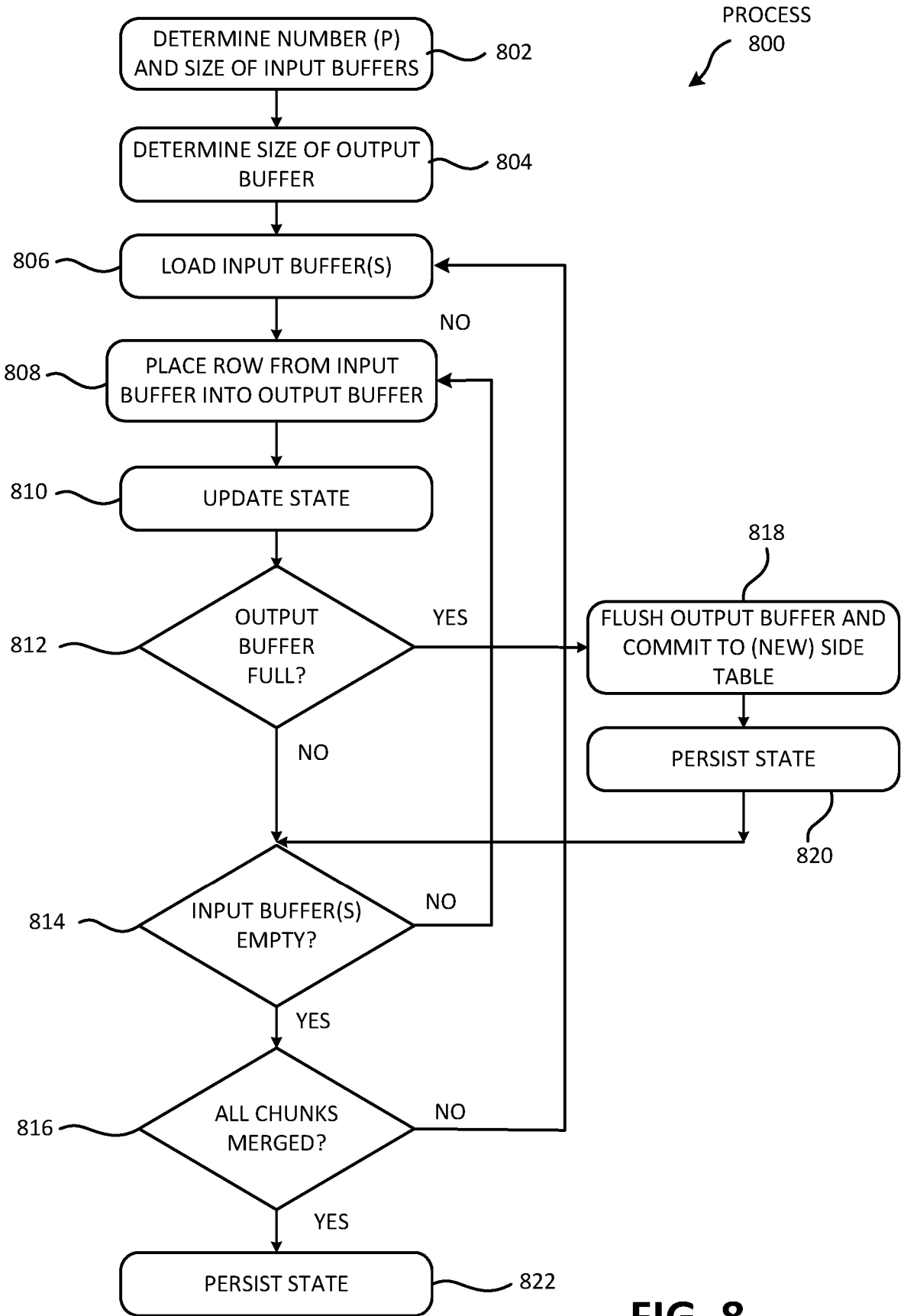
FIG. 8 is a flowchart of a resumable merge in one embodiment.

FIG. 8 is a flowchart of an exemplary process 800 for performing a merge sort in one embodiment. Process 800 is described with respect to input side table 752 and output side table 754 of FIG. 7B. Process 800 may be performed by resumable-sort component 380 running in database management system 374 in processor 320, for example. Process 800 may be just one thread executing to sort unsorted dataset 402. Process 800 may input a side table and output a side table (defined in OUTPUT SIDE TABLE field 556). If process 800 is performing a "final" (the last) merge, then process 800 may output to the requesting user, process, component, or operator (and OUTPUT SIDE TABLE field 556 may indicate so). If process 800 is performing its first merge, then process 800 may create an output side table (as identified by OUTPUT SIDE TABLE field 556). In the example below, side table 412 (input side table 752) is merged to form output side table 754.

Process 800 may begin with the determination of the number and size of input buffers 706 (act 802). Determining the number and size of input buffers 706 may occur dynamically (such as at the start, restart, or resumption of a merge). The number of input buffers 706 may be the same as the threshold used for determining when to start a merge (act 622 in FIG. 6). In the example of FIG. 7A, there are P number of input buffers. In one embodiment, the size of input buffer 706-x is based on the smallest possible size the buffer can be without incurring a wait time (from input/output) to refill the buffer once a row is moved from the input buffer 706 to output buffer 710. Also, in this embodiment, the number of buffers is based on the maximum number of buffers 706-x possible in volatile memory 302 based on the size of buffer 706-x. For example, the number of buffers may be based on the amount of memory available and the size of input buffers 706. Further, the size and number of input buffers 706-x in volatile memory 302 may be selected to avoid the paging of the buffers to nonvolatile memory 306. In one embodiment, the number and size of input buffers 706 may be determined by a user, process, or component to meet an SLA (such as defined in SLA field 514) regarding lost work in the event of a failure or pause in the sort operation 380.

Process 800 may also determine the size of the output buffer (act 804). In one embodiment, the size of output buffer 710 may be the same as the size of input buffers 706. In another embodiment, the size of output buffer 710 may be determined by a user, process, or component to meet an SLA (such as defined in SLA field 514) regarding lost work in the event of a failure or pause in the sort operation 380. If output buffer 710 is flushed when full to nonvolatile memory 304, a larger output buffer 710 may result in more lost work in the event of a failure or pause of sort operation 380. A smaller output buffer 710 may result in less lost work in the event of a failure or pause of sort operation 380. A smaller output buffer 710, however, may cause additional delays (input/output) during a sort if the state of the sort (or merge) is persisted when output buffer 710 is flushed.

Process 800 may continue with the reading a number (P) of sorted chunks 414 into corresponding input buffers 706 (act 806) in volatile memory 302 (act 806) (such as from nonvolatile memory 304). Because input buffers may be smaller than the size of sorted chunks 414, the entirety of chunks 414 may not fit into input buffers 706.

Process 800 continues with the placement of one of the rows from an input buffer 706-x (and hence the corresponding sorted chunk 414-x) into output buffer 710 (act 808). When a row is placed in output buffer 710, the state is updated (act 810). In this example, updating the state may include incrementing the corresponding value in CHUNK START ROW field 522 and decrementing the value in CHUNK LENGTH field 554 (for the corresponding chunk). The updated state is not necessarily persisted (at this point in this embodiment). Placing rows from input buffers 706 into output buffer 710 and updating state (acts 808 and 810) continues so long as output buffer 710 is not full (act 812: NO) and the input buffers are not empty (act 814: NO). If an input buffer is 706-x is empty (act 814: YES), but not all the chunks have been merged (act 816: NO), then more rows may be loaded into one of the input buffers 706-x (act 806).

If output buffer 710 is full (act 812: YES), then the contents of output buffer 710 may be flushed and committed to the output side table (act 818). As shown in FIG. 7B, for example, chunk 758-1 includes three buffer flushes. Output side table 754 may be identified by the value in OUTPUT SIDE TABLE field 556 of metadata 550 associated with input side table 752. When a buffer is flushed (act 818), the state may be and persisted (act 820). In this case, persisting the state may include persisting metadata 550 associated with both input side table 752 and output side table 754. Persisting metadata of input side table 752 may include writing the state of CHUNK START ROW fields 522 and CHUNK LENGTH fields 554 for the chunks of the input side table. Because the state of these fields 522 and 554 were previously updated (act 810), persisting these fields stores the state of input side table. Persisting metadata 550 of output side table 754 may include increasing the length of CHUNK LENGTH field 554 (from CL2 to CL3 as shown in FIG. 7B) or creating a new entry of metadata 550 for a new chunk with both CHUNK FIRST ROW field 552 and CHUNK LENGTH field 554. As noted above, the output side table may be identified by OUTPUT SIDE TABLE field 556. The first instance of process 800 may form a new sorted chunk 758-1 of output side table 754. Chunks from subsequent instances of process 800 (such as for sorting chunks 414-4 through chunk 414-M) may be appended to a result of previous sorted chunk 758-1 (as shown in FIG. 7B as sorted chunk 758-Q).

Like process 600, process 800 effectively divides a sort operation into a plurality of portions (such as filling input buffers with portions of chunks), performs a sort operation on each portion (such as filling an output buffer), persists results (flushing the output buffer) of the sort of that portion, and persists a state of the sort operation that identifies the portions of the sort operation that have been performed. As described in more detail below, this may allow the sort operation to be resumed after failure or pause.

Process 800 may be described as reading the sorted chunks 414 into input buffers 706; merging the sorted chunks into the output buffer 710; persisting data in the output buffer 710 to nonvolatile memory 304 (such as when output buffer 710 is full); and/or persisting metadata (second metadata) (such as pointers) to each of the sorted chunks indicating a portion of the corresponding sorted chunk that corresponds to the persisted data in the output buffer. Persisting the corresponding plurality of sorted chunks to the nonvolatile memory may include committing the corresponding plurality of sorted chunks to a side table. Persisting the data in the output buffer to nonvolatile memory may include committing the data in the output buffer to a side table.

Should a sort operation be paused (such as in a failure), then the operation may be resumed based on the persisted metadata, such as the scan metadata 502 and/or the metadata 550. Resuming sort operation 380 is discussed in more detail below with respect to FIG. 9.

Figure 9:
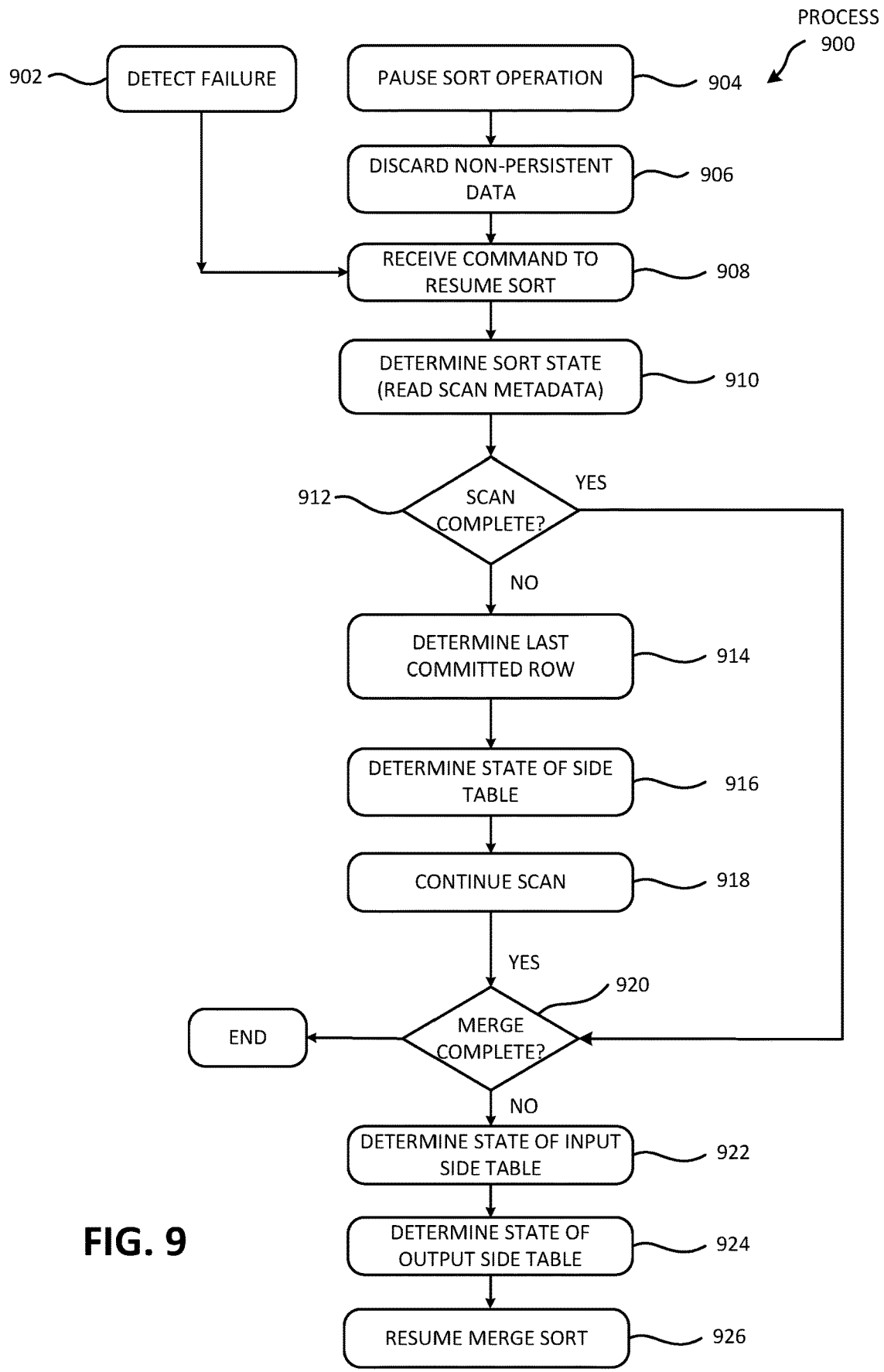
FIG. 9 is a flowchart of an exemplary process for resuming a paused sort in one embodiment.

FIG. 9 is a flowchart of an exemplary process 900 for resuming a sort operation that had been paused (or failed). Process 900 may be performed by resumable-sort component 380 running in database management system 374 in processor 320, for example. Process 900 may be just one thread executing to sort unsorted dataset 402. In this example, resumable-sort component 380 may start process 900 because it detected a failure (act 902). Alternatively, sort component 380 may start process 900 because it received a pause-sort command (act 904). In the case of having received a pause-sort command (act 904), the non-persistent data (such as data in volatile memory 302) may be discarded (a similar result to having encountered a failure) (act 906) and the sort resumed when a resume-sort command is received (act 908).

To resume the sort, the state of the sort (having failed or paused) is determined by, for example, reading the state metadata (including the scan metadata 502 and/or metadata 550) (act 910). In the examples above, the scan metadata 502 should exist even if sort operator 380 has not begun and/or finished a merge (such as process 800). The state of the sort (scan) may be determined by reading STATUS field 522 in metadata 502.

If the scan has not been completed (act 912: NO), then process 900 may determine the last committed row (act 914) for each thread that was operating on the unsorted dataset. For example, process 900 may read LAST COMMITTED ROW field 520 for each thread (defined in THREAD ID field 512) for the dataset defined by INPUT DATASET field 524. Process 900 may also determine the state of any side table 412 that was previously written to (act 916). For example, process 900 may read the side table (defined in TARGET SIDE TABLE field 526) and the associated metadata 550 that specifies each of the sorted chunks. Process 900 may then restart the failed (or paused) scan (such as for each identified thread) by resuming process 600 (the scan) (act 918) based on metadata 502 and metadata 552—with the input dataset (defined by INPUT DATASET field 524 starting at the last committed row) and continuing to output to the side table identified in SIDE TABLE ID field 526. As discussed above, process 600 includes reading input dataset 402 and outputting to side table 412.

If the scan is complete (act 912: YES), then process 900 may resume a merge if one has not yet finished (act 920: NO). The state of the sort (such as scan or merge phase) may be determined by reading STATUS field 522 in metadata 502. To resume the merge, the state of any input side table may be determined (act 922). The state of an input side table may be determined by reading, for each thread identified in THREAD ID field 512, CHUNK START ROW fields 552 and CHUNK LENGTH fields 554 for a side table identified in TARGET SIDE TABLE field 526, for example. Process 900 may continue with the determination of the state of any output side tables (act 924) (if one exists). The state of an output side table may be determined by reading, for a side table identified in OUTPUT SIDE TABLE field 556, CHUNK START ROW fields 552 and CHUNK LENGTH fields 554.

Process 900 may continue with the resumption of process 800 (act 926) based on the state identified in metadata 502 and metadata 550.

When a sort operation is resumed (such as by process 900), the number of threads that resume the sort may be scaled up or down from the previously failed (or paused) sort. For example, if one thread performed a sort that was paused, then two threads may resume the sort. Likewise, if three threads performed a sort that was paused, then two threads may resume the sort. Thus, the embodiments disclosed above enable a user to scale up the number of threads performing a sort (such as by pausing and resuming the sort) or scale down the number of threads performing the sort (also by pausing and resuming the sort). In other words, sort component 380 may resume a sort operation, after the sort operation paused, with a different number of computing threads performing the sort operation. Thus, process 900 shows resuming the sort operation, after the sort operation paused, based on the persisted state of the sort operation.

In one embodiment, the maximum chunk size may be determined based on a service-level agreement (SLA). For example, an SLA may specify that a sort, if failed or paused, does not lose more than 5 minutes of sort time (a maximum sort time). The maximum chunk size may be determined based on the maximum sort time.

The resumable sort described above, when implemented in a database, may enable a shorter transaction logs than otherwise. Thus, embodiments may be advantageous for users of database management systems (DBMS) that enforce a maximum transaction log length.

Embodiments described above may be used in conjunction with the embodiments disclosed in U.S. patent application Ser. No. 14/526,118, filed Oct. 28, 2014, and titled "Online Schema and Data Transformations," which is incorporated by reference herein. Embodiments described above may also be used in conjunction with embodiments disclosed in U.S. patent application Ser. No. 15/588,323, filed May 5, 2017, and titled "Resumable and Online Schema Transformation," which is incorporated by reference herein. Embodiments described above may also be used in conjunction with embodiments disclosed in U.S. patent application Ser. No. 62/414,346, filed Oct. 28, 2016, and titled "Resumable and Online Schema Transformation," which is incorporated by reference herein. For example, any sort of datasets discussed in these applications may incorporate the techniques disclosed herein.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise. Additionally, "exemplary" means "an example."

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer system comprising:
a processor; and
a computer-readable medium having stored thereon instructions that are executable by the processor to configure the computer system to perform the following:
  receive a database command to perform a sort operation on an unsorted dataset, wherein at least a portion of the unsorted dataset is stored in nonvolatile memory;
  determine a maximum chunk size for reading portions of the unsorted dataset from the nonvolatile memory;
  read a first chunk of the unsorted dataset from the nonvolatile memory to volatile memory, wherein the first chunk has a size less than or equal to the maximum chunk size;
  sort the first chunk to generate a first sorted chunk;
  persist the first sorted chunk to the nonvolatile memory;
  persist, in the nonvolatile memory, a state of the sort operation, the state of the sort operation comprising first information indicating progress of sorting chunks in the unsorted dataset and second information identifying at least one location in the nonvolatile memory where sorted chunks should be written;
  pause the sort operation after persisting the state of the sort operation; and
  resume the sort operation, after the sort operation was paused, based on the first information and the second information in the state of the sort operation.

2. The computer system of claim 1, wherein persisting the state of the sort operation comprises persisting first metadata identifying the portion of the unsorted dataset that corresponds to the first sorted chunk.

3. The computer system of claim 2, further comprising additional instructions that are executable by the processor to
commit the first sorted chunk to a side table when persisting the first sorted chunk to the nonvolatile memory.

4. The computer system of claim 2, wherein the maximum chunk size is based on a service level agreement.

5. The computer system of claim 4, further comprising additional instructions that are executable by the processor to
resume the sort operation, after the sort operation was paused, based on the persisted first metadata.

6. The computer system of claim 2, wherein:
sorting the first chunk to generate the first sorted chunk includes reading the first sorted chunk into one or more input buffers, reading the first sorted chunk into an output buffer, and persisting data in the output buffer to nonvolatile memory when the output buffer is full; and
persisting the state of the sort operation includes persisting second metadata identifying a portion of the first sorted chunk that corresponds to the persisted data in the output buffer.

7. The computer system of claim 6, further comprising additional instructions that are executable by the processor to:
commit the first sorted chunk to a side table when persisting the first sorted chunk to the nonvolatile memory; and commit the data in the output buffer to the side table when persisting the data in the output buffer to the nonvolatile memory.

8. The computer system of claim 7, further comprising additional instructions that are executable by the processor to resume the sort operation, after the sort operation was paused, based on the persisted second metadata.

9. The computer system of claim 8, further comprising additional instructions that are executable by the processor to resume the sort operation, after the sort operation was paused, with a different number of computing threads performing the sort operation.

10. A method comprising:

receiving a database command to sort an unsorted dataset;

determining a maximum chunk size based at least in part on reducing information lost in event of failure and reducing intermediate merges;

dividing a sort operation, for sorting the unsorted dataset, into a plurality of portions based on the maximum chunk size;

performing a first portion of the sort operation;

persisting intermediate results from the first portion of the sort operation; and persisting a state of the sort operation, the state of the sort operation comprising first information indicating progress of sorting chunks in the unsorted dataset and second information identifying at least one location in nonvolatile memory where sorted chunks should be written;

pausing the sort operation after persisting the state of the sort operation; and resuming the sort operation, after the sort operation was paused, based on the first information and the second information in the state of the sort operation.

11. The method of claim 10, wherein:

performing the first portion of the sort operation includes reading a plurality of unsorted chunks of the unsorted dataset from a nonvolatile memory into a volatile memory, sorting each of the plurality of unsorted chunks to generate a corresponding plurality of sorted chunks, and persisting the corresponding plurality of sorted chunks to the nonvolatile memory; and persisting the state of the sort operation includes persisting first metadata identifying a portion of the unsorted dataset that corresponds to the persisted corresponding plurality of sorted chunks.

12. The method of claim 11, wherein persisting the corresponding plurality of sorted chunks to the nonvolatile memory includes committing the corresponding plurality of sorted chunks to a side table.

13. The method of claim 11, wherein reading the plurality of unsorted chunks includes reading the unsorted chunks to a maximum chunk size based on a service level agreement.

14. The method of claim 13, further comprising resuming the sort operation, after the sort operation was paused, based on the persisted first metadata.

15. The method of claim 11, wherein:

performing the first portion of the sort operation includes reading the corresponding plurality of sorted chunks into a plurality of input buffers, merging the corresponding plurality of sorted chunks into an output buffer, and persisting data in the output buffer to the nonvolatile memory when the output buffer is full; and persisting the state of the sort operation includes persisting second metadata identifying a portion of a sorted chunk that corresponds to the persisted data in the output buffer.

16. The method of claim 15, wherein:

persisting the corresponding plurality of sorted chunks to the nonvolatile memory includes committing the corresponding plurality of sorted chunks to a side table; and persisting the data in the output buffer to the nonvolatile memory includes committing the data in the output buffer to the side table.

17. The method of claim 16, further comprising resuming the sort operation, after the sort operation was paused, based on the persisted second metadata.

18. The method of claim 17, further comprising resuming the sort operation, after the sort operation was paused, with a different number of computing threads performing the sort operation.

* * * * *